March 11, 1969     P. FORTESCUE     3,432,388
NUCLEAR REACTOR SYSTEM WITH FISSION GAS REMOVAL
Filed April 8, 1968     Sheet 3 of 3
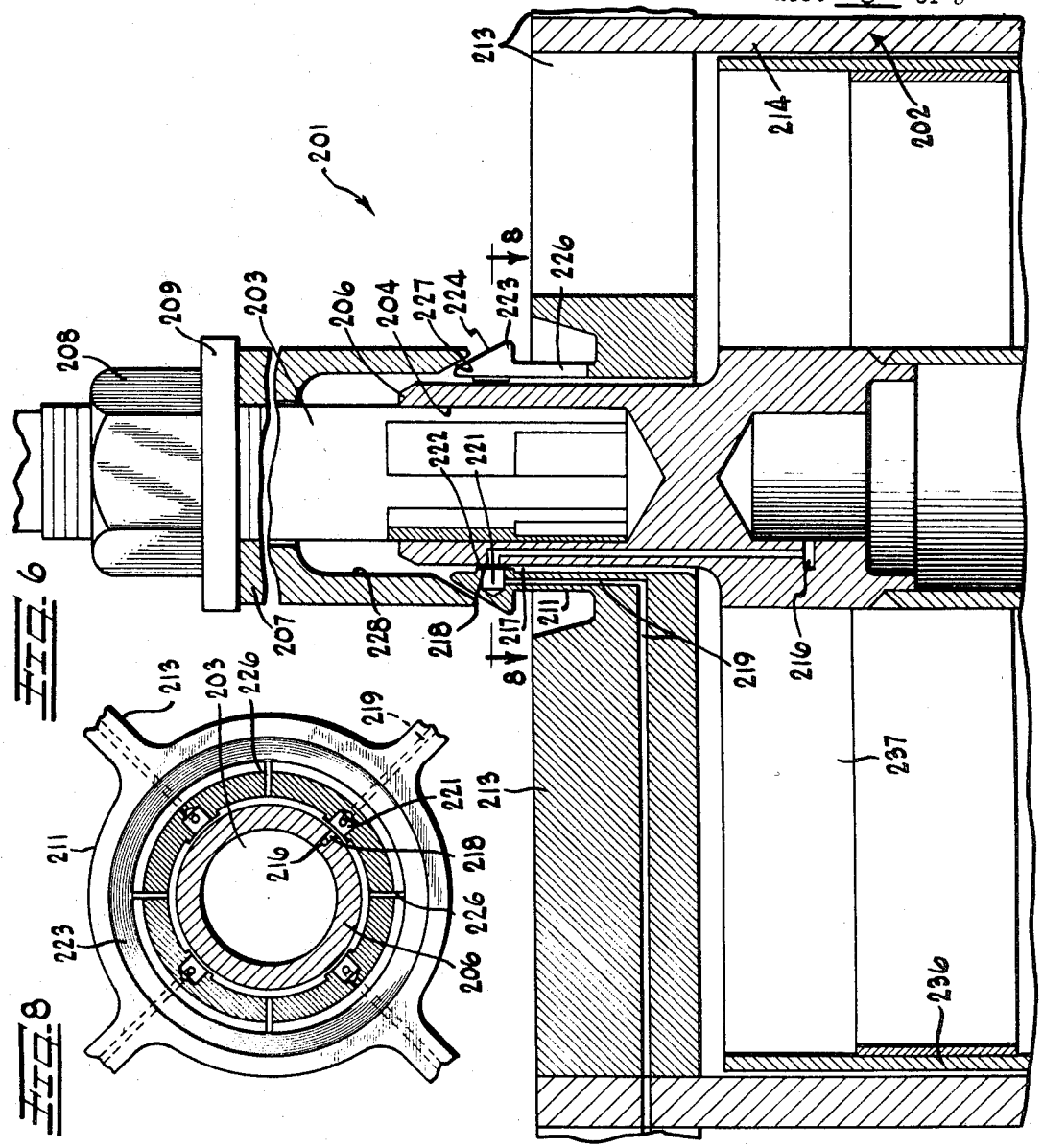
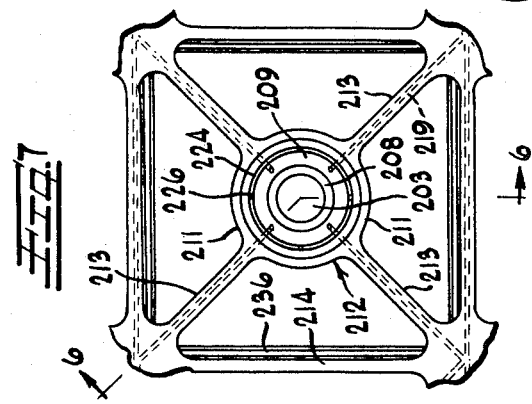
INVENTOR
Peter Fortescue
ATTORNEY

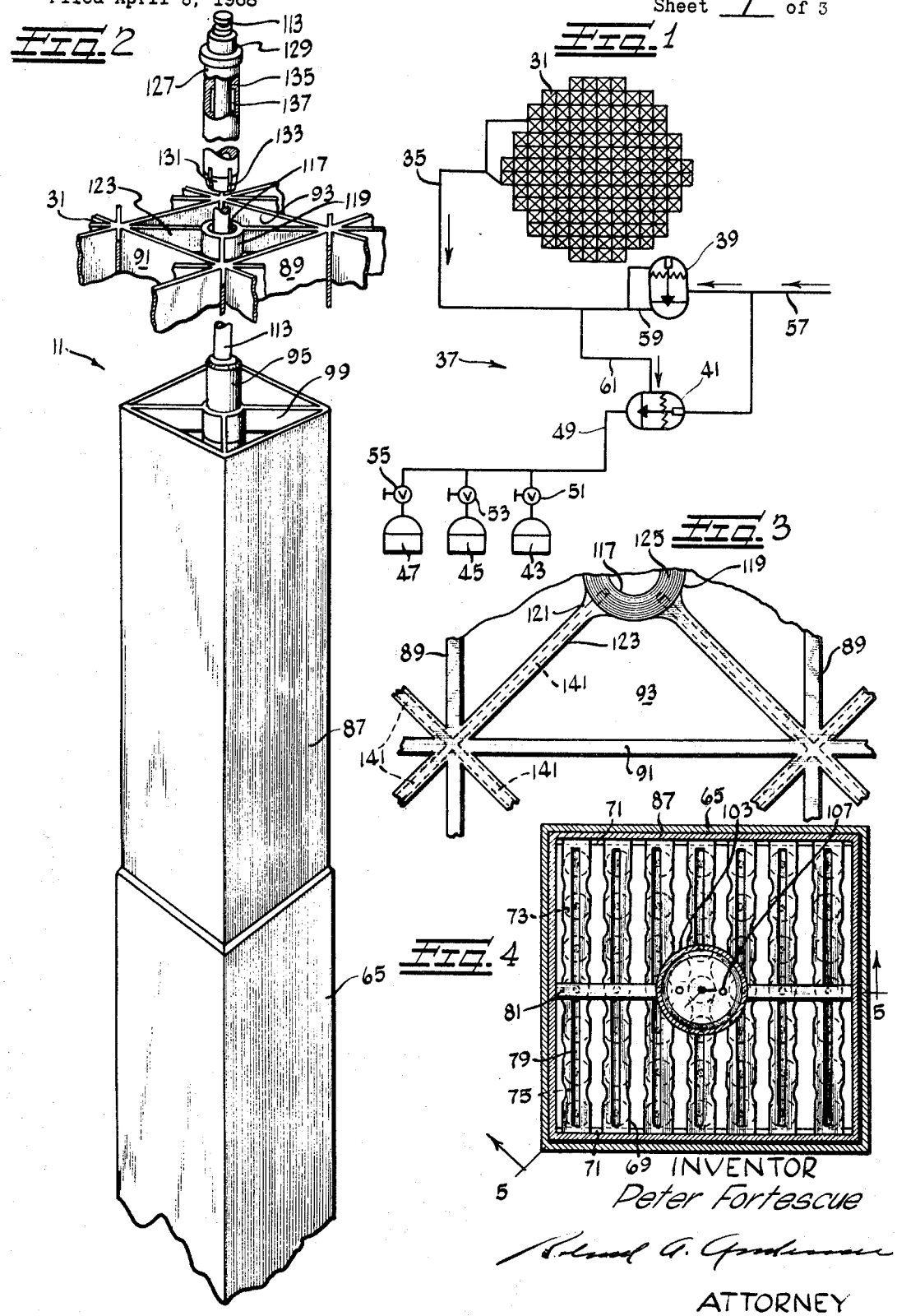

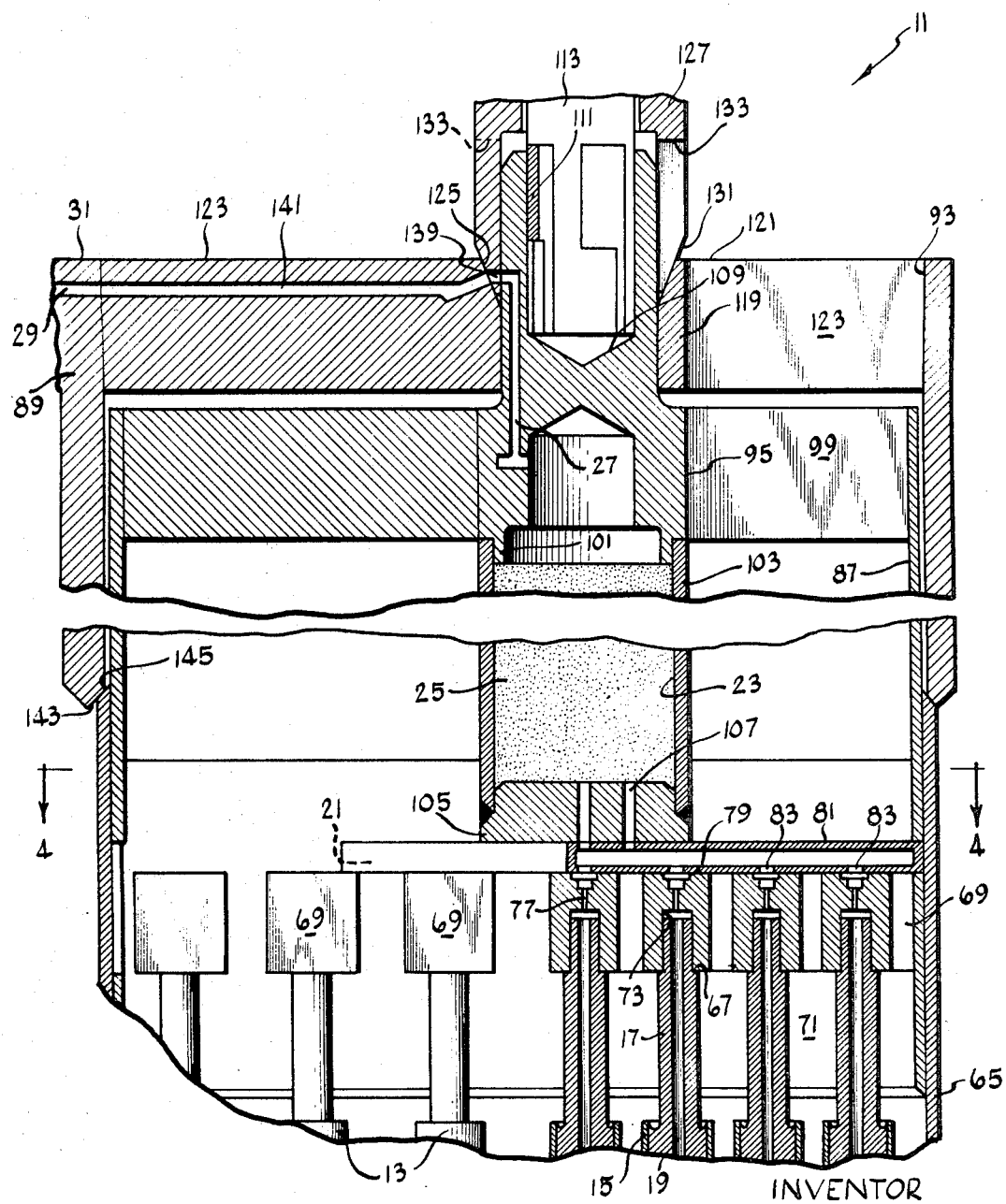

United States Patent Office 3,432,388
Patented Mar. 11, 1969

3,432,388
NUCLEAR REACTOR SYSTEM WITH
FISSION GAS REMOVAL
Peter Fortescue, La Jolla, Calif., assignor to the United
States of America as represented by the United States
Atomic Energy Commission
Continuation-in-part of application Ser. No. 645,578,
June 9, 1967. This application Apr. 8, 1968, Ser.
No. 725,558
U.S. Cl. 176—37             16 Claims
Int. Cl. G21c 19/20, 19/32

ABSTRACT OF THE DISCLOSURE

A fluid-cooled nuclear reactor is described having a venting system for relieving pressure inside clad fuel pins. A passageway network interconnects the interiors of otherwise sealed clad fuel pins in different fuel elements, and gas is admitted thereto to initially bring the internal pressure to within a given increment of the coolant pressure at startup. When fission products cause the internal pressure to increase, gas is vented to storage vessels to maintain the internal pressure proportional to the coolant pressure.

---

This application is a continuation-in-part of application Ser. No. 645,578, filed June 9, 1967 and now abandoned.

This invention relates to nuclear reactors, and more particularly to nuclear reactors wherein a system is provided for the extraction of fission product gases generated by the nuclear fuel employed within fuel elements.

In nuclear reactors which employ solid nuclear fuel, in many instances it is desirable to clad the nuclear fuel with a suitable material, such as a metal, which will effectively separate the fuel from the fluid coolant stream that is circulated through the reactor core to extract the heat therefrom. One purpose of such a cladding in a nuclear fuel element is to prevent contamination of the coolant by the fuel. Throughout its life in the core of a nuclear reactor, a nuclear fuel element is subjected to prolonged periods of high irradiation level and high temperatures. Accordingly, the cladding should be capable of maintaining its integrity throughout the fuel element life, taking in account that swelling or changes in the volume of the solid nuclear fuel material may occur and that fission product gases will be generated by the nuclear fuel material.

In fast reactors in general wherein it is economically desirable to achieve high burnup in enriched nuclear fuels, the amount of fission product gases which will be created over the presently expected lifetime of a fuel element is considerable. Accordingly, those involved in reactor design, and especially in the design of high temperature gas-cooled reactors, are behooved to make some provision for these fission product gases.

U.S. Patent 3,291,698 shows one type of nuclear reactor fuel element which is considered suitable for use in a high temperature gas-cooled fast reactor wherein a sealed can is used as a cladding for solid nuclear fuel material. In the fuel element illustrated in this patent, a material such as sodium, which is fluid at the operating temperature, is employed to substantially fill the can and also to facilitate heat transfer from the fissionable fuel to the wall of the can. A flexible portion of the can is provided which will expand or contract in response to the pressure differential between the interior and the exterior of the can to equalize the pressure therebetween. In this fuel element, the fission product gases are stored within the can in the region of variable volume provided by the flexible portion. Although there are many advantages to employing this type of a fuel element which is considered satisfactory for certain nuclear reactor applications, from a potential hazards standpoint it might not be desirable to employ a material such as liquid sodium within certain types of nuclear reactors.

Rather than store the gaseous fission products within a sealed fuel element can, there are various reasons why it may be advantageous to remove the fission products from the immediate vicinity of the reactor core and store them either exterior of the reactor or in some other part of the reactor where they will have a significantly reduced effect upon the neutron economy of the reactor core. Various arrangements have previously been proposed for removing fission products from fuel elements in a nuclear reactor core. For example, U.S. Patent 3,201,320 shows the creation of a purge gas flow through a porous graphite section of each fuel element employed in a gas-cooled reactor, which purge gas flow is channeled by a passageway network to an isolated portion of the reactor. In addition to providing some increase in the neutron economy in the reactor core, removal of the fission products from an otherwise sealed fuel element can allow the spent fuel element to be shipped to a remote reprocessing site without individual depressurization of each can or without the hazard of shipping the fuel element cans in a pressurized condition. Improved systems of removing fission products from fuel elements are desired.

It is an object of the present invention to provide an improved nuclear reactor wherein fission products created in individual fuel element cans are removed from the vicinity of the fuel elements during reactor operation. It is another object to provide a nuclear reactor having an improved arrangement for removal of gaseous fission products from otherwise sealed fuel element cans to a location remote from the immediate vicinity of the reactor core which arrangement includes few detachable connections. It is a further object to provide an improved nuclear reactor core arrangement for a fast reactor utilizing a multitude of solid nuclear fuel-containing, thin-walled fuel element cans. Still another object is to provide a gas-cooled nuclear reactor utilizing a plurality of individual thin-walled cans wherein the pressure differential between the interior of the fuel element cans and a pressurized coolant system is maintained within desired limits. Other objects and advantages of the invention will become apparent from the following description of selected embodiments of the invention when read in conjunction with the accompanying drawings, wherein:

FIGURE 1 is a diagrammatic view illustrating portions of a nuclear reactor system embodying various features of the invention;

FIGURE 2 is an exploded perspective view with portions broken away of a fuel element from the reactor core illustrated in FIGURE 1, together with portions of the structure which supports that fuel element in the reactor core;

FIGURE 3 is a fragmentary plan view of the reactor support structure shown in FIGURE 2;

FIGURE 4 is an enlarged horizontal sectional view of the fuel element taken generally along line 3—3 of FIGURE 5;

FIGURE 5 is a vertical sectional view, enlarged in size, taken generally along the line 5—5 of FIGURE 4, showing the fuel element in its assembled state supported within a nuclear reactor core;

FIGURE 6 is a partial vertical sectional view similar to part of FIGURE 5 illustrating an alternative embodiment of the invention;

FIGURE 7 is a top view of the embodiment of FIGURE 6; and

FIGURE 8 is a sectional view taken along the line 8—8 of FIGURE 6.

In the embodiment illustrated in FIGURES 1–5, a fuel element 11 is provided which is a cluster or assembly of a plurality of individual fuel pins 13. Each of the fuel pins 13 includes an elongated thin-walled can 15 suitably closed at its bottom and hung in the reactor by a plug 17 at its top. A bore 19 through the top plug 17 serves as a vent passageway, and a manifold system 21 in the upper end of each fuel element interconnects the vent passageways of each of the fuel pins 13 in that fuel element. The manifold system 21 includes a fairly large cylindrical chamber 23 centrally disposed in the upper region of the fuel element 11 above the fuel pins 13. This central chamber 23 is filled with a suitable material 25, such as activated charcoal, which traps via absorption heavy metal fission products that would otherwise tend to deposit or plate out in the passageways further along in the manifold system.

As best seen in FIGURE 5, a passageway 27 interconnects the top of the central chamber 23 with a location on the exterior surface of a portion of the fuel element support means which serves to hang the illustrated fuel element 11 in its assembled location within a reactor core. The support means at this point forms the only detachable connection between the vent passageways of each of the fuel pins 13 in one fuel element 11 and a passageway network 29 in a horizontally extending grid plate 31 which serves as the support structure for hanging the fuel elements 11 in the nuclear reactor. The passageway network 29, which extends throughout the horizontal grid plate 31 as more particularly described hereinafter, redundantly connects the manifold system 21 of each fuel element in fluid communication with the manifold systems of adjacent fuel elements.

As best seen in FIGURE 1, a conduit 35 leads from one or more locations along the edge of the grid plate 31 to a gas regulation system 37. The gas regulation system 37 includes regulator valves 39 and 41 and vessels 43, 45 and 47, which are connected in parallel to a common line 49 via shutoff valves 51, 53 and 55, respectively. The regulator valves 39 and 41 open and close in response to a pressure differential across a diaphragm disposed therewithin. Both valves 39 and 41 act in response to the pressure differential between the coolant stream, which is in communication via the line 57, and the pressure within the fuel pins 13.

When a nuclear reactor is first loaded, the pressure within the reactor and within the fuel pins 13 is atmospheric. When a gas-cooled reactor is pressurized so that the pressure of the circulating coolant stream is increased to the desired operating pressure of the reactor, for example, 1000 p.s.i., the pressure of the coolant stream fairly quickly exceeds the pressure within the fuel pins which would remain at about atmospheric. However, the valve 39 is designed to open when the pressure differential exceeds a preselected increment, for example 100 p.s.i. When the valve 39 opens, the coolant gas is fed through the line 59 into the line 35 until the pressure within the fuel pins reaches a value within 100 p.s.i. of the coolant stream pressure.

During reactor operation, fission product gases are created by the fissioning of the nuclear fuel material within the fuel pins 13, and the buildup of these gases increases the internal pressure within the individual fuel pins which is transmitted to the valve 41 through the line 35 and the line 61. The valve 41 has a diaphragm which is in communication with the pressure within the fuel pins 13 on one side and with the pressure of the coolant stream through the line 57 on the other side. The valve 41 is set to open when the pressure within the fuel pins 13 increases to a value within a predetermined increment, about 10 p.s.i., of the pressure of the coolant stream. Opening of the valve 41 places the line 61 in communication with the line 49 leading to the vessels. The valve 51 on the vessel 43 is open, and the valves 53 and 55 on the remaining vessels 45 and 47 are closed. Thus, when the valve 41 opens, the gases which have built up in the fuel elements 11 are bled into the vessel 43 which is initially at substantially atmospheric pressure. Of course, as soon as the pressure in the fuel pins 13 drops to a value below the predetermined differential, the valve 41 closes. Thus it can be seen that the valve 41 will intermittently open and close during reactor operation to intermittently bleed the fission product gases from the fuel pins 13, while regulating the pressure of the gas within the fuel pins so that it remains at a value just slightly below the pressure of the pressurized coolant stream and thus provides adequate internal support for the thin-walled cladding.

The gas regulator system 37 maintains the gas pressure in the fuel pins 13 and throughout the remainder of the overall venting system always at a value below the coolant stream pressure so that any leakage which might conceivably occur throughout the system will be inward into the system, rather than outward into the coolant stream. A leak outward into the coolant stream would likely cause undesirable contamination of the circulating coolant stream with radioactive fission product gases. Furthermore, in the event of a loss of coolant pressure, whether inadvertent, as in an emergency situation, or deliberate, as during refueling, the valve 41 opens as soon as coolant pressure drops and remains open until the fission product gas pressure is reduced to a value lower than the coolant pressure by the predetermined differential or until a point is reached when the capacity of the vessel 43 limits further pressure drop of the interconnected system.

Before the reactor is unloaded, the pressure of fission product gas within the fuel pins 13 is reduced to atmospheric or slightly therebelow. This is accomplished by use of the vessel 45 and, if necessary, the vessel 47. The vessels 45 and 47 may be initially evacuated to a few millimeters of pressure, or a vacuum pump (not shown) may be provided in association therewith to periodically evacuate these vessels. Before unloading, the valve 51 is closed to seal the vessel 43 from the system, and the valve 53 to the evacuated vessel 45 is opened. Generally, the evacuated vessel 45 is sufficient to reduce the pressure of the fuel pins within the fuel elements in the portion or zone of the reactor core with which it is associated to subatmospheric pressure. However, if the pressure should not drop to the desired level, the additional vessel 47 can be employed. Thus, proper employment of the gas regulation system 37 significantly reduces the danger of contamination by gaseous fission products during refueling. Moreover, the system 37 has the additional advantage, that the evacuation of the fission products to a pressure level below atmospheric is accomplished without the need for a vacuum pump handling radioactive fission products because the vessels 45 and 47 are evacuated to the desired degree of vacuum before either of the valves 53 and 55 is opened.

The particular venting system employed in the illustrated embodiment of the fuel element 11 is best seen from FIGURES 4 and 5 wherein the fuel element 11 is illustrated as including an outer sheath or open-ended box 65 of generally square cross section wherein an array of forty-nine fuel pins 13, seven rows of seven each, are supported. Of course, the specific numbers of fuel pins shown is merely chosen for purposes of illustration, and either more or less fuel pins may be employed within a specific fuel element if desired. For instances, in one fast gas-cooled reactor which is being designed, it is presently intended to use fuel elements of this general type employing fifteen rows of fifteen fuel pins 13 each. It should be understood that the cross sectional form of the fuel box may be of different configuration than a square and the fuel pins may be of any suitable pitch which is compatible with the fuel box.

Each of the fuel pins 13 includes the thin-walled can 15 which is suitably sealed at its upper periphery via the top plug 17, as by welding thereto, the bore 19 of which plug serves as the vent passageway for the fuel pin. The top plugs 17 are circular in cross section, as are the fuel cans 15, and the upper end of the top plug 17 is reduced in diameter to provide a shoulder 67. The fuel pins 13 are hung within the fuel element boxes 65 from the underside of seven crossbeams 69 which span the interior of the fuel element box extending between ledges provided by plates 71 secured to opposite sides of the inner wall of the fuel element box 65. Each of the illustrated crossbeams 69 has seven holes 73 of circular cross section provided in its underside and evenly spaced. As shown in FIGURE 4, the crossbeams 69 are reduced in width in the regions between the holes 73 to present less of an obstruction to coolant flow which is intended to be axially downward through the open-ended boxes.

The top plug 17 and the crossbeams 69 are made of a suitable material, such as stainless steel. As can be seen in FIGURE 5, the reduced diameter extension of each of the top plugs 17 extends into one hole 73 in the underside of the crossbeams to the extent permitted by the shoulder 67 and is suitably affixed in this position, as by welding. An open trench or channel 75 is cut in the top surface of each of the crossbeams 69 which runs substantially the entire length thereof, terminating slightly short of each end. A small hole 77 drilled vertically through the crossbeam 69 connects each of the larger holes 73 in the underside of the crossbeam with the trench 75. Recessed cover plates 79 seal the top of the trench 75 completely except for an opening in the very center, substantially above the middle fuel rod in the row, through which opening communication is made to an overlying header 81. It should be understood that the trench is used for manufacturing convenience and that a circular cross section could be drilled in the crossbeam 69 in its place.

The header 81 runs transverse to the crossbeams 69 and likewise spans the distance between opposite sidewalls of the fuel element box 65. In the illustrated embodiment, the header 81 is a narrow hollow box which may be welded from four long narrow plates of stainless steel and two small end pieces. There are seven holes 83 through the bottom of the header box, one being disposed in fluid communication with and directly above the central opening to the trench 75 in each of the crossbeams. The overlying header 81 is suitably attached to the seven crossbeams 69 in a manner to preclude leakage of gas from the joint therebetween, as by welding the header onto the upper surface of each of the crossbeams. Thus, the hollow center of the header 81 interconnects all of the fuel pins 13 with one another through the respective openings in the crossbeams 69.

The fuel element box 65 has an upper open boxlike extension portion 87 of slightly smaller dimensions which extends upward from its upper end. The horizontal grid plate 31 is formed of a plurality of generally vertically disposed metal plates 89 and 91 which run perpendicular to each other and intersect at right angles and form a grid structure having a plurality of open, vertically aligned compartments 93 of generally square cross section. Each one of these vertically extending compartments 93 is proportioned to accept the extension portion 87 of a fuel element box.

To support the fuel element 11 in this desired location in a grid plate compartment 93, a central hanger 95 is provided at a location so that it protrudes above the top of the fuel element box extension 87. The central hanger 95 is suitably supported in this location by four webs 99 which extend diagonally inward from the four corners of the box-like extension 87 and which are suitably secured to the box and to the hanger, as by welding. The bottom end of the central hanger is recessed to provide a smaller diameter portion 101 which seats a tube 103 exteriorly thereof which is suitably secured thereto as by welding. A plug 105 closes the bottom of the tube 103 thus forming the central chamber 23 that is filled with the material 25, such as activated charcoal, which traps the heavy metal fission products to remove them from the vent stream of gas from the fuel rods during reactor operation. Three appropriately sized holes 107 extend through the plug and through the top surface of the header 81 to provide a flow passageway interconnecting the header with the chamber 23.

The upper end of the chamber 23 extends into the open bottom region of the central hanger 95 where it is connected by the passageway 27 to the passageway network 29 running throughout the grid plate structure. Passageway 27 may be provided with valving means to seal the fuel element during refueling operations. However, it is believed that a discussion of the overall support arrangement for a fuel element box in its compartment 93 in the grid plate 31 is appropriate before further tracing the manifold gas passageway system in detail.

The upper end of the central hanger 95 is formed with a central cavity 109 therein that is shaped with suitable projections 111 to permit joining the hanger by a bayonet or J-type coupling to the bottom of a long pullrod 113. The pullrod 113 extends upwardly through the top of the reactor pressure vessel via a standpipe (not shown) which forms a part of a penetration opening through the pressure vessel.

The bayonet coupling that is formed between the suitably cutout lower end of the pullrod 113 and the projections 111 which extend from the sidewalls of the cavity 109 in the central hanger 95 is designed as to permit the rod 113 to be coupled and uncoupled to and from the hanger by rotating the rod relative to the fuel element. However, the projections 111 extending from the cavity are so shaped and proportioned to form a J-type coupling. This J-type coupling maintains the pullrod 113 with a definite predetermined rotative orientation relative to the central hanger 95 once the bayonet coupling has been made and the pullroad is in tension, as when it is supporting the fuel element box which is hanging therefrom.

When the fuel element is supported in the nuclear reactor, the pullrod 113 and hanger 95 pass upward through a central bore 117 of appropriate diameter in a boss 119 that is part of a spider 121 having four legs 123 which extend diagonally inward to the boss from the four corners at the top of each square compartment 93 formed in the grid plate 31. The legs are suitably affixed to the boss 119 and to the corners of the grid plate compartments, as by welding, to provide a load bearing and gastight connection therewith. The entire weight of the fuel element 111 is supported via the boss 119.

The upper end of the boss 119 is provided with a conical-shaped support surface 125 which surrounds the bore opening therethrough. To transmit the weight of the fuel element 111 from the pullrod 113 to the conical surface 125 of the boss, a thrust sleeve 127 is disposed in surrounding relation to the pullrod and an annular nut 129 (FIG. 2) has internal threads (not shown) which mate with external threads (not shown) on the upper portion of the pullrod. The lower end of the thrust sleeve 127 is provided with a conical surface 131 of the same angular inclination as the conical surface 125 on the boss. At the location of the conical surface 131 formed at the bottom edge of the thrust sleeve 127, one or more slots 133 (see FIG. 5) are cut so as to convert the lower end of the thrust sleeve 127 into a type of collet chuck. The inner diameter of the bottom of the thrust sleeve 127 is about equal to the outer diameter of the cylindrical portion of the hanger 95 that it abuts. In the assembled configuration, the weight of the fuel element is transmitted from the pullrod to the nut, to the upper end of the thrust sleeve, and then to the boss. The radial slots 133 extend to the bottom of the thrust sleeve 127 and thus give the bottom of the thrust sleeve the necessary elasticity to provide not only an excellent seal between the mating conical surfaces, but also an excellent seal between the cylindrical outer surface of the hanger 95 and the inner cylindrical surface of the thrust sleeve 127 in the regions in which the vent passageway connections are established. To establish a predetermined definite relative rotative orientation between the pullrod 113 and the thrust sleeve 127, the upper portion of the thrust sleeve is provided with internal splines 135 (see FIG. 2) which coact with keys 137 set in the exterior of the pullrod near its upper end at a location just below the threaded portion to which the annular nut 129 is attached.

Because of the establishment of predetermined relative rotational disposition of the various elements which make up the fuel element support means, a gastight connection which is demountable on removal of the fuel element 11 from the reactor core is readily established. The relative rotational relationship between the boss 119 and the hanger 95 of the fuel element is maintained via the fairly close fit that is established between the exterior surface of the upper extension 87 of the fuel element box and the interior sidewalls of the compartment 93 in the grid plate within which the fuel element is held. In this respect, as may be seen from FIGURE 5, the height or depth of the plates 89 and 91 which make up the upper grid plate structure slightly exceeds the distance that the extension 87 extends upwardly above the fuel element box 65. In an actual fuel element-reactor arrangement, the height of the extension 87 may be about three feet in a fuel element 11 having a total height of about ten feet. Accordingly, the fuel element box extension 87 is held encastre within the closely fitting surrounding compartment walls in a fashion that might be termed cantilevered downward. As previously indicated, the J-type bayonet coupling established a predetermined relative rotational disposition between the pullrod 113 and the hanger 95, and the keys 137 and splines 135 near the upper ends of the pullrod and the thrust sleeve establish a relative rotational orientation between the thrust sleeve and the pullrod. Thus, a short hole 139 can be drilled through the collect chuck bottom of the thrust sleeve 127 and the hanger 95 in the exact location in each of the four quadrants where it will form a part of the passageway 27 through the hanger and meet with the passageway network 29 in the grid plate.

A highly redundant passageway network for the fission product gases is provided in the grid plate structure. As can be seen from FIGURES 3 and 5, each of the legs 123 of the spiders 121 is provided with a drilled passageway 141 which extends throughout its diagonal length and into the conical surface 125 of the boss. As best seen in FIGURE 3, the individual passageways 141 in the legs of the spiders at the corners of the compartment 93 are interconnected by an X-intersection with the passageways 141 from the three other compartments which form the set of four compartments of the grid plate structure which meet at each corner. Accordingly, each passageway 141 leading from a specific fuel element-suporting boss 119 is interconnected at the corner with those in the next three adjacent spiders 121. Interconnection between the passageways in the four legs of each single spider is provided by the four duplicate passageways 27 that each extend from the fuel element half of the detachable connection down into the upper region of the central chamber 23. Of course, if less redundancy is required, the number of the passageways 141 may be reduced, such as by providing a passageway in only one of the legs 123 in each spider 121. The number of X-intersections with passageways in adjacent spiders may therefore be correspondingly less.

The elongated holes which constitute the passageways 141 in the legs of the spiders 121 can be made of any suitable size that can be conveniently drilled or otherwise formed in the materials, such as stainless steel, from which the supporting grid structure is made. For example, it is considered that passageways one-eighth inch in diameter would be more than sufficient to handle the fission product gas flow. For example, in a fast high-temperature gas-cooled reactor having a nominal power output of 1000 mw.(e) which might employ in the neighborhood of 45,000 fuel pins 13 each having a nuclear fuel-containing portion of about 0.3 inch in diameter and about 100 cm. long would only evolve about 1 cc. of fission product gas at the operating pressure of about 1000 p.s.i. every two minutes. Accordingly, even if one of the shall passageways in the network 29 might become partially blocked with plateout, the potential problem would be avoided either by diffusion of the gas through the partially blocked passageway or by flow of the gas through another portion of the redundant passageway network.

When the fuel elements 11 are loaded in the reactor, a fuel element is located below the desired compartment 93 in the reactor grid structure and is coupled to a pullrod 113 extending down through the boss 119 in the supporting spider 121 at the upper end of the chosen compartment. A hoist, operated from above the reactor pressure vessel through the standpipe, then lifts the pullrod 113 upward with the fuel element box extension 87 properly oriented to enter the compartment.

As can be seen from FIGURE 5, the lower edges of the plates 89 and 91 which from the compartment sidewalls are chamfered to provide an inwardly inclined peripheral surface 143 and the fuel element box is provided with mating peripheral inclined surface 145 which facilitate guiding the fuel element box extension 87 into the compartment and centering it therein. With the fuel element 11 positioned generally in location, the thrust sleeve 127 and the nut 129 are installed over the top of the pullrod 113 with the keys 137 and splines 135 arranged to assure the desired relative rotative orientation. As the annular nut 129 is then tightened down on the threaded upper portion of the pullrod 113, the fuel element box becomes positively clamped between the upper and lower locations on the grid structure compartment in which it is installed. More specifically, the lower collet chuck end of the thrust sleeve 127 is wedged into the region between the conical surface 125 of the boss and the concentric inner cylindrical surface of the hanger 95, thereby transmitting the full weight of the fuel element to the boss, as the upper inclined edge of the fuel element box 65 is wedged against and within the peripheral chamfered edge of the grid plate compartment. The tightening of the annular nut 129 which clamps the fuel element securely in the grid structure compartment wedges the collet chuck portion of the thrust sleeve firmly between the conical surface of the boss and the cylindrical surface of the hanger, thus creating an extremely tight joint at the only detachable connection in the fission product manifold system serving the multitude of fuel rods 13 present in one fuel element 11.

In one system currently being considered, it is proposed to divide the overall reactor core into eight different zones and to provide each of the eight zones with a separate gas regulation system 37 and gas collection vessels as have been heretofore described. One of the advantages of such a division is that, in the unlikely instance that a leak might occur which would cause coolant gas to seep into the gas passageway network from the coolant stream during normal operating conditions, the leak could be detected by monitoring the flow of gas into the vessel 43, and the division of the core into a plurality of zones would isolate the leak to a particular fraction of the total core. The division of the overall core into the zones may be provided in a suitable manner, as by eliminating or plugging interconnections at the crossovers at the corners of the compartments in the grid structure. It can be seen that the division of the core into the different zones still leaves nearly the same degree of redundancy in the fission product passageway network 29 in a particular zone. Additional advantage of this redundancy may, if desired, be taken by connecting the line 35 to the gas regulator system 37 for one zone at a plurality of points along the periphery of the grid plate structure 31.

It should be noted that the venting redundancy achieved in the fuel element grid network may also be achieved in the gas regulator systems by suspending the vessels 43, 45 and 47 from a support structure similar to the one described hereinbefore for the fuel elements.

In addition to providing an increase in the neutron economy of the reactor core by manifolding the fission products to vessels either exterior of the core or to vessels shielded by suitable neutron reflector material, the gas regulation system permits a reduction in the required strength of the cladding 15. Large differentials between the pressure interior and exterior of the fuel pins are avoided, even at reactor start-up. Any pressure differentials are such as to place the cyclindrical metal cans in compression, wherein they are more resistant to creep than when subjected to tension. Accordingly, the present invention enables fuel pins to be employed in reactors of this type wherein the thickness of the metal cladding, for example Hastelloy X, is only about 5% of the radius of the fuel pin 13. Moreover, it enables fuel pins 13 for high temperature gas-cooled reactors to be made using stainless steel cans about 0.34 inch in diameter that have 0.010 to 0.015 wall thickness.

Referring now to FIGURES 6–8, a further embodiment of the invention will be described. In the embodiment of FIGURES 6–8, only one detachable connection is required for each fuel element, rather than the two detachable connections used in the embodiment of FIGURES 1–5. The fuel element 201 in the embodiment of FIGURES 6–8 is suspended from a support structure which includes a horizontal grid plate 202 in a manner similar to the first described embodiment. Thus, a pullrod 203 is coupled, within the central cavity 204 of a hollow cylindrical hanger 206, by a suitable bayonet or J-type coupling. The pullrod 203 extends upwardly through the top of the reactor pressure vessel via a standpipe (not shown) which forms a part of a penetration opening through the pressure vessel. As was the case in the previous embodiment, the J-type coupling maintains the pullrod 203 with a definite predetermined rotative orientation relative to the central hanger 206 once the coupling has been properly made and the pullrod is in tension, as when it is supporting the fuel element hanging therefrom. A thrust sleeve 207 surrounds the pullrod 203 and the load on the rod is transferred to the sleeve at the upper end of the rod by a securing nut 208 threaded to the upper end of the pullrod. The nut 208 bears against the upper end of the thrust sleeve 207 through a thrust washer 209.

With the fuel element 201 supported in the grid-like support structure, the pullrod 203 and hanger 206 pass upwardly through a hollow cylindrical boss 211 of appropriate inner diameter. The boss is part of a spider 212 having four legs 213 which extend inwardly at 90° intervals to the boss from the intersections of pairs of vertical plates 214. The plates 214 are arranged rectangularly in a gridwork to form compartments for receiving the upper ends of the fuel elements 201. The legs 213 are suitably affixed to the boss 211 and to the corners of the grid plate compartments, as by welding, to provide a load bearing and gastight connection therewith. The entire weight of the fuel element 201 is supported via the boss 211.

In order to remove fission gases from the fuel element 201, a passage 216 consisting of two intersecting bored sections is provided in the hanger 206. One end of the passageway 216 terminates in the outer cylindrical surface 217 of the hanger 206, forming an orifice 218 therein. A fission gas passage 219 is provided in one of the legs 213 and terminates at an orifice 221 in the inner cylindrical surface 222 of the hollow cylindrical boss 211. The cylindrical surfaces 222 and 217 mate with each other, and the fuel element 201 is so aligned in the grid structure 202 that the orifices 221 and 218 are alinged to provide communication between the passages 216 and 219. To facilitate communication, the passage 219 is made of relatively large diameter at the orifice 221 by suitable machining. Since the passage 219 passes downwardly in the boss 211 from the orifice 221 and passes directly therefrom into the leg 213, only one detachable connection per fuel element is required, that is, at the orifices 221 and 218.

In order to maintain tight mating contact between the surfaces 222 and 217, and thus insure a gas-tight seal at the orifices 218 and 221, a pair of conical mating surfaces are provided generally similar to those provided in the previously described embodiment. The hollow cylindrical boss 211 is provided with a region of enlarged thickness 223 disposed annularly about its upper end. This region is provided with an outer conical surface 224 generally opposite the mating surface 222 in which the orifice 221 is disposed. The region of the mating surface 222 and the conical surface 224 are made radially deformably by providing four slots 226 distributed circumferentially about the boss and extending from one end thereof. The lower end of the thrust sleeve 207 is provided with a conical surface 227 which forms part of the interior surface of the sleeve. At the lower end of the sleeve, a region 228 of enlarged inner diameter is provided contiguous with the conical surface 227. When the thrust sleeve 207 is loaded axially against the boss 211 by the nut 208, the action of the mating conical surfaces 224 and 227 produces a loading on the deformable portion of the boss which is radially inward, pressing the two surfaces 222 and 217 against each other to maintain a seal at the orifices 218 and 221. Since there is no fission gas passage necessary in the thrust sleeve 207, it is unnecessary to provide this sleeve with internal splines to maintain a given relationship with the pullrod 203, as was the case in the previously described embodiment.

The fuel element 201 is identical with that described in the previous embodiment and includes a fuel box consisting of four vertical walls of identical size. The upper edge of the walls are chamfered to mate with a corresponding chamfer on the lower edge of the plates 214 in the support structure 202. The fuel element box includes an upper section of reduced size consisting of four identical vertical plates 236 welded to the walls. The walls 236 mate with the interior hexagonal compartment defined by the plates 214. Four horizontal legs 237 extend inwardly from the upper ends of the wall 236 and support the hanger 206. The legs 237 are suitably secured to the walls 236 and the hanger 206, such as by welding. The remainder of the fuel element (not shown) may also be as described in the first embodiment.

It may therefore be seen that the invention provides an improved nuclear reactor including an improved arrangement for removal of gaseous fission products from otherwise sealed fuel element cans to a location remote from the immediate vicinity of the reactor core, such system having a minimal number of detachable connections. Pressure differential between the interior of the fuel element cans and a pressurized coolant system is maintained within desired limits.

Various modifications and changes in the illustrated embodiment may be made without departing from the scope of the invention that is defined by the following claims.

What is claimed is:

1. A nuclear reactor comprising, a support structure, a plurality of fuel elements removably supported by said support structure to form a part of the reactor core and being positioned for cooling by a circulating fluid coolant, each of said fuel elements including a plurality of fuel pins, each of which contains nuclear fuel material within an outer surrounding cladding that is sealed except for a vent passageway, manifold means in each fuel element interconnecting said vent passageways in said fuel pins, a first mating surface on each of said fuel elements, a plurality of second mating surfaces on said support structure each adapted to mate with one of said first mating surfaces when a corresponding fuel element is supported by said support structure, each of said fuel elements having first passageway means connected to said manifold means therein and terminating at an orifice in said first mating surface, said support structure having second passageway means for connection to gas collection means and terminating at an orifice in each of said second mating surfaces, and means for releasably clamping said fuel elements to said support structure to hold said mating surfaces in fluid tight engagement with each other and with the orifices of said first and second passageway means aligned.

2. A nuclear reactor in accordance with claim 1 wherein first valve means is provided for controlling the venting flow to allow fission product gas flow from the interiors of said fuel pins to the gas collecting means only when the pressure within said fuel pins rises to a value within a predetermined increment of the pressure of the circulating fluid coolant, and wherein second valve means is provided for injecting gas into said fuel pin interiors through said vent passageways whenever the pressure of the circulating fluid coolant exceeds the pressure within said fuel pins by an amount greater than a preselected increment, said preselected increment being greater than said predetermined increment.

3. A nuclear reactor in accordance with claim 1 wherein each of said manifold means includes a fission product trap.

4. A nuclear reactor in accordance with claim 1 wherein each of said fuel elements comprises an outer box of noncircular cross section which is disposed in a surrounding accommodating compartment in said reactor support structure, wherein a beveled surface is provided adjacent the opposite end of said reactor structure compartment from that at which said conical support surface is located, and wherein a mating beveled surface is formed on the exterior surface of said fuel element box, which beveled surfaces abut one another, thus forming a part of said clamping means.

5. A nuclear reactor in accordance with claim 4 wherein a plurality of crossbeams span the interior of said fuel element box and wherein means are provided for attaching the ends of said fuel pins to support said fuel pins from said crossbeams, said attaching means being provided with bores therein communicating with the interior of said fuel pins to provide said vent passageways.

6. A nuclear reactor in accordance with claim 5 wherein said manifold means includes a passageway in each crossbeam which interconnects the vent passageways of all of the fuel pins supported by a single crossbeam, said manifold means further including an upper header which interconnects each of the crossbeam passageways.

7. A nuclear reactor in accordance with claim 1 wherein said first and second mating surfaces are generally cylindrical and are disposed in axial pairs, wherein said support structure includes a hollow cylindrical portion for each fuel element, said hollow cylindrical portions each having a conical surface thereon, wherein said support structure further includes a plurality of thrust sleeves each coaxial with at least part of one of said first cylindrical portions and each having a conical surface at one end mating with said conical surface on said one hollow cylindrical portion, said clamping means being of a configuration to load said thrust sleeves axially in a direction to clamp said conical surfaces against each other, said conical surfaces being positioned to direct such axial load into a radial loading of said first and second mating surfaces against each other.

8. An nuclear reactor comprising, a support structure, a plurality of fuel elements removably supported by said support structure to form a part of the reactor core and being positioned for cooling by a circulating fluid coolant, a first generally cylindrical mating surface on each of said fuel elements, a plurality of second generally cylindrical mating surfaces on said support structure, said first and second mating surfaces being disposed in coaxial pairs and adapted to mate with each other when a corresponding fuel element is supported by said support structure, each of said fuel elements having first passageway means for accumulating fission gas and terminating at an orifice in said first mating surface, said support structure having second passageway means for connection to gas storage means and terminating at an orifice in each of said second mating surfaces, said support structure including a hollow cylindrical portion for each fuel element, said hollow cylindrical portions each having a conical surface thereon, said support structure further including a plurality of thrust sleeves each coaxial with at least part of one of said first cylindrical portions and each having a conical surface at one end mating with said conical surface on said one first cylindrical portion, and clamping means for releasably loading said thrust sleeves axially in a direction to clamp said conical surfaces against each other, said conical surfaces being positioned to direct such axial load into a radial loading of said first and second mating surfaces against each other with the orifices of said first and second passageway means aligned.

9. A nuclear reactor according to claim 8 wherein each fuel element includes an elongated portion extending through said corresponding first cylindrical portion, and wherein said clamping means include means releasably securing said elongated portions to said thrust sleeves.

10. A nuclear reactor according to claim 9 wherein each of said first mating surfaces comprises at least part of the outer surface of one of said elongated portions, wherein said conical surfaces on said thrust sleeves form at least part of the outer surfaces thereof, wherein each of said second mating surfaces comprise at least part of the inner surface of one of said thrust sleeves at the same end as the conical surface, wherein the conical surface on said hollow cylindrical portion forms at least part of the inner surface thereof, and wherein said thrust sleeves are each slotted in the region of said second mating surface to be radially deformable.

11. A nuclear reactor according to claim 9 wherein each of said first mating surfaces comprises at least part of the outer surface of one of said elongated portions, wherein each of said second mating surfaces comprises at least part of the inner surface of one of said hollow cylindrical portions, wherein the conical surfaces on said hollow cylindrical portions form at least part of the outer surface thereof in the region of said second mating surfaces, and wherein said first cylindrical portions are slotted in the region of said second mating surfaces to be radially deformable.

12. In a gas-cooled nuclear reactor having a plurality of fuel pins containing solid nuclear fuel material within a surrounding cladding, the improvement which comprises means for manifolding to receiving means exterior of said fuel pins the gaseous fission products from each of said fuel pins through vent passageway means in the otherwise sealed cladding, first value means controlling the venting flow to allow gas flow from said fuel pins to said receiving means only when the pressure within said fuel pins rises to a value within a predetermined increment of the pressure of the gas coolant stream, and second valve means for admitting gas from the coolant stream to the interiors of said fuel pins through said vent passageways whenever the pressure of the gas coolant stream exceeds the pressure within said fuel pins by an amount greater than a preselected increment, said preselected increment being greater than said predetermined increment.

13. The invention in accordance with claim 12 wherein ancillary evacuated receiving means is provided and wherein means is provided for disconnecting said receiving means from said first valve means and connecting thereto said ancillary evacuated receiving means which has sufficient volume capacity to evacuate a substantial portion of the gaseous fission products from the fuel pins when placed in communication therewith.

14. The invention in accordance with claim 12 wherein said fuel pins each comprise cylindrical compacts of nuclear fuel material having circular cross sections and wherein said surrounding cladding has a thin wall, the interior diameter of which approximates the exterior diameter of said compacts.

15. The invention in accordance with claim 14 wherein said cladding htas a wall thickness of no greater than about 5% of the radius of the cross section of said cladding.

16. The invention in accordance with claim 15 wherein said cladding material is stainless steel having a wall thickness of about 0.015 inch or less.

References Cited

UNITED STATES PATENTS

| | | | |
|---|---|---|---|
| 3,010,889 | 11/61 | Fortescue et al | 176—37 |
| 3,201,320 | 8/65 | Fortescue et al | 176—59 |
| 3,207,670 | 9/65 | Fortescue et al | 176—37 |
| 3,238,105 | 3/66 | McNelly | 176—37 |
| 3,357,893 | 12/67 | Gatley et al | 176—37 |

CARL D. QUARFORTH, *Primary Examiner.*

HARVEY E. BEHREND, *Assistant Examiner.*

U.S. Cl. X.R.

176—19, 59, 68, 78, 87